(12) United States Patent
Shen et al.

(10) Patent No.: US 7,035,505 B2
(45) Date of Patent: Apr. 25, 2006

(54) OPTICAL PERFORMANCE MONITOR

(75) Inventors: Jinxi Shen, San Ramon, CA (US); Robert R. McLeod, Boulder, CO (US); Douglas E. Crafts, San Jose, CA (US); Barthelemy Fondeur, Mountain View, CA (US); Yong Ding, Shanghai (CN); Pang-Chen Sun, San Diego, CA (US)

(73) Assignee: JDS Uniphase Corporation, San Jose, CA (US)

( * ) Notice: Subject to any disclaimer, the term of this patent is extended or adjusted under 35 U.S.C. 154(b) by 4 days.

(21) Appl. No.: 10/896,779

(22) Filed: Jul. 22, 2004

(65) Prior Publication Data

US 2005/0031259 A1 Feb. 10, 2005

Related U.S. Application Data

(60) Provisional application No. 60/489,545, filed on Jul. 23, 2003.

(51) Int. Cl.
*G02B 6/28* (2006.01)
*H04B 10/00* (2006.01)

(52) U.S. Cl. .................................. 385/24; 398/135
(58) Field of Classification Search ................ 385/24; 398/135, 157
See application file for complete search history.

(56) References Cited

U.S. PATENT DOCUMENTS

| 5,233,405 | A | 8/1993 | Wildnauer et al. ......... 356/333 |
|---|---|---|---|
| 5,414,540 | A | 5/1995 | Patel et al. .................. 359/39 |
| 5,617,234 | A | 4/1997 | Koga et al. ................ 359/131 |
| 6,075,647 | A | 6/2000 | Braun et al. ............... 359/578 |
| 6,084,695 | A | 7/2000 | Martin et al. .............. 359/131 |
| 6,363,089 | B1 | 3/2002 | Fernald et al. ............... 372/20 |
| 6,377,730 | B1 | 4/2002 | Bergmann et al. ........... 385/39 |
| 6,424,466 | B1 | 7/2002 | Flanders .................... 359/578 |
| 6,542,659 | B1 | 4/2003 | Flanders ...................... 385/20 |
| 6,701,042 | B1 * | 3/2004 | Kang et al. .................. 385/37 |
| 6,868,200 | B1 * | 3/2005 | Kimotsuki et al. .......... 385/24 |
| 6,941,079 | B1 * | 9/2005 | Barozzi et al. ............ 398/157 |
| 2002/0191887 | A1 * | 12/2002 | Bidnyk ....................... 385/15 |
| 2004/0096151 | A1 * | 5/2004 | Svilans et al. ............... 385/27 |

OTHER PUBLICATIONS

"Silica-Based Thermo-Optic Switches" by M. Okuno et al. NTT Review vol. 7 No. 5, Sep. 1995.

* cited by examiner

*Primary Examiner*—Sung Pak
*Assistant Examiner*—Tina M Wong
(74) *Attorney, Agent, or Firm*—Allen, Dyer, Doppelt, Milbrath & Gilchrist, P.A.

(57) ABSTRACT

An apparatus for monitoring an input optical signal at a plurality of distinct optical frequencies is disclosed wherein a demultiplexing arrayed waveguide grating (AWG) having a plurality of M>1 Vernier input ports is disposed between an optical switch and a photodiode array coupled to the output ports of the AWG. In operation, the optical switch sequentially provides the input optical signal into each of the Vernier ports, and signals detected by photodiodes are stored in a memory unit. The apparatus is capable of monitoring the input optical signal with a frequency step which is M times smaller than a frequency spacing between the AWG transmission bands, and obtain M frequency-resolved readings from each photodiode.

22 Claims, 8 Drawing Sheets

OPTICAL PERFORMANCE MONITOR

CROSS-REFERENCE TO RELATED APPLICATIONS

This application claims priority of U.S. Provisional Patent Application No. 60/489,545 filed Jul. 23, 2003, entitled "Optical Channel Monitor with Integrated Arrayed Waveguides", which is incorporated herein by reference for all purposes.

FIELD OF THE INVENTION

The present invention generally relates to optical devices, and more particularly relates to optical performance monitors and optical spectrum analyzers for optical communications.

BACKGROUND OF THE INVENTION

Optical communication systems employing wavelength division multiplexed (WDM) technology achieve large transmission capacity by spacing optical channels as closely as possible, typically less than a nanometer (nm) apart. As the channel spacing decreases, monitoring spectral characteristics of the channels becomes more critical in verifying system functionality, identifying performance drift, and isolating system faults. For example, such monitoring is critical in detecting wavelength drift, which can readily cause signals from one optical channel to cross into another. Also, real-time feedback to network elements is critical to ensure stable operation of optical amplifiers commonly employed in the network.

Optical instruments for measuring optical power as a function of wavelength, called optical spectrum analyzers (OSAs), are known in the art. Most conventional OSAs use a wavelength tunable optical filter, such as a Fabry-Perot interferometer or diffraction grating, to resolve the individual spectral components. In the latter case, light is reflected off the diffraction grating at an angle proportional to the wavelength. The spectrum of the light is then analyzed on the basis of the angle at which the light is diffracted using a detector array. Alternatively, the diffracted light is moved over a slit and then detected using a small detector.

Alternatively, a Fabry-Perot interferometer may be used consisting of two highly reflective, parallel mirrors that act as a resonant cavity, which transmits light only at a unique frequency (wavelength). Wavelength tuning may be accomplished by varying the mirror spacing or rotating the interferometer with respect to the incident light so as to provide an optical spectrum analysis.

Other OSAs known in the art are based on the Michelson interferometer, wherein the incident light is split into two paths. One path is fixed in length, and the other is variable so as to create an interference pattern between the signal and a delayed version of itself, known as an interferogram. The wavelength of the incident light can be determined by comparing the zero crossings in the interferogram with those for a known wavelength standard. The optical spectrum, however, is determined by performing a Fourier transform on the interferogram.

Traditional optical spectrum analyzers (OSAs) are manufactured as laboratory devices which have to operate under laboratorial environmental conditions. A sophisticated wavelength and optical power calibration from time to time is required to ensure the wavelength and power accuracy of the device. Furthermore, they are generally bulky as well as costly.

Optical communication systems require industrial grade optical performance monitors (OPM), which function similarly to the traditional OSA, but are however subject to stringent industrial requirements. They must be relatively inexpensive, compact in size, with the reporting power and wavelength accuracy nearly the same as laboratorial grade OSAs, however without requiring extra calibration during the lifetime of the device, and be capable of monitoring light at densely spaced frequency points with high wavelength resolution and high dynamic range.

It is advantageous to have an OPM capable of monitoring all channels in one optical band of an optical communication link. It is also advantageous to have an additional functionality of monitoring an optical to signal noise ratio (OSNR) for each channel, which requires monitoring not only individual channels, but also light between channels to estimate an optical noise level, thereby further increasing spectral resolution requirements for an OPM. Today's WDM networks may employ as many as ~200 channels with 25 GHz spacing between the channels in one optical communication band of ~5000 GHz, which would benefit from an OPM capable of monitoring at lest 200 frequency channels with 25 GHz spacing. Such an OPM could also be advantageously used in communication systems having 200 GHz, 100 GHz, and 50 GHz spaced channels by providing an OSNR monitoring capability.

Industrial-grade OPMs can be divided in two basic groups. The first one is based on tunable filters with output coupled to a photodetector, wherein the spectrum is measured by scanning the filter passband over a frequency range of interest, and adjacent spectral points are accessed sequentially in time. The tunable filter employed in this approach can be based on a bulk—surface or volume—grating, a fiber Bragg grating, a tunable linear or ring resonator. The second group of OPMs acquires all monitored spectral points of an optical spectrum of an input signal in parallel by dispersing the input light in space and using a plurality of photodetectors, e.g. a photodetector array, to simultaneously acquire spectral information at a plurality of monitored frequencies; a bulk grating, a blazed fiber Bragg grating, or an array waveguide grating can be used as such a dispersive element.

Both these approaches have their advantages and disadvantages. Using tunable filters may require complex dynamic control loops and real-time monitoring of the tuning to ensure reproducibility. Parallel acquisition of spectral data requires multiple photodetectors, which negatively affects cost and reliability of the monitor. The respective disadvantages of the two approaches are exacerbated when higher wavelength resolution and a larger number of spectral points to be analyzed is required. For example, both the size of the dispersive element and the number of photodiodes scale proportionally to the wavelength resolution, thereby increasing the size and cost of the device and reducing it reliability. Similarly, higher wavelength resolution requires larger tunable filters and progressively more strict requirements on tuning filters wherein progressively finer tuning is required, complicating the control loops and affecting reproducibility issues.

The present invention obviates these issues by providing a solution combining the aforedescribed approaches in a way wherein each the size, the design complexity, e.g. the number of photosensitive elements, and the control complexity of the monitor scales sub-linearly with a number of monitored wavelengths within a monitored range of wavelengths, thereby enabling monitoring of a large number of wavelength in a compact relatively inexpensive device which can be fabricated in a planar lightwave circuit (PLC)

chip. The solution employs a multi-input multi-output dispersive element that allows avoiding the use of tunable filters that may require complex real-time monitoring and control.

One spectrum analyzer described in U.S. Pat. No. 5,617,234 issued Apr. 1, 1997 in the name of Koga et al. discloses a multi-wavelength simultaneous monitoring circuit capable of precise discrimination of wavelengths of a wavelength division multiplexed (WDM) signal, and suitable for optical integrated circuits. The device proposed by Koga is an AWG that has a single input port and multiple output ports and has photodetectors coupled to the output ports of the AWG. Although Koga's device shares certain similarities with the invention described hereafter, it requires an AWG having a number of output ports equal to a number of monitoring channels with frequency resolution better than spacing between the channels, and a number of costly photodetectors equal to the number of channels to be monitored.

An AWG has a functionality of splitting an input signal into several output frequency bands, each having a bandwidth b, centered at a set of frequencies fn spaced by an output frequency spacing $\Delta f > b$, and dispersing them in space to different locations where they are picked up by output waveguide to be output through their respective output ports. AWGs offer several advantages when used as the dispersive elements, such as compactness, option of on-chip integration with other optical components of an optical circuit thereby drastically lessening optical losses and reducing cost and complexity of the optical circuit, and manufacturing technology amenable to mass-production. However, they typically offer only limited frequency resolution with a limited, typically between 8 and 40, number of output channels, with a typical frequency spacing between output channels of ~400 to 50 GHz. Decreasing the frequency spacing further below 25 GHz requires progressively larger and more expensive devices, with increasing cost per monitored channel.

A US patent application 2004/0096151 A1 to Svilans et al. assigned to JDS Uniphase, the assignee of this application, discloses an AWG-based OPM that combines a single-input port AWG with a tunable filter having a bandwidth and an FSR to obviate the aforementioned problems, by monitoring a larger number of channels, greater than a number of AWG output ports and associated photodiodes. The tunable filter pre-selects periodic subsets of channels to be input through the single input port of the AWG, and different subsets of channels are sent sequentially to the input port of the AWG thereby time-sharing the AWG and associated photodiodes coupled to the output ports of the AWG to acquire information about a number of spectrally-resolved channels larger than the number of AWG output ports and coupled to them photodiodes.

Although the devices proposed by Svilans et al. functions somewhat similar to the invention described herein, it employs a tunable filter that may require real-time monitoring and relatively complex control circuitry to ensure wavelength tuning reproducibility.

An object of this invention is to provide an optical performance or optical spectrum monitor that requires fewer detectors and fewer sequential acquisition events than frequencies to be monitored without the use of tunable frequency-selective elements.

It is a further object of this invention to provide an optical performance monitor that is substantially integrated within a single chip and wherein detectors are time-shared between the signals to be analyzed.

It is a further object of this invention to provide a switched optical performance monitor having a dispersive element with switchable multiple input ports wherein frequency resolution of the OPM is increased by switching between the input ports.

SUMMARY OF THE INVENTION

In accordance with the invention, an optical apparatus for monitoring an input optical signal is provided, comprising:
a dispersive element having M input ports and J output ports, wherein M>1 and J>1;
control means disposed to receive the input optical signal for providing the input optical signal sequentially to each of the M input ports; and,
monitoring means optically coupled to the J output ports for monitoring one or more optical signals output therefrom for collecting information about the input optical signal.

In accordance with one aspect of the invention herein provided, the optical apparatus is for monitoring the input optical signal at a first plurality of K distinct optical frequencies, and wherein:
the dispersive element couples an m-th input port to a j-th output port at an optical frequency $f_{m,j}$ for all integer values of m and j satisfying conditions $1 \leq j \leq J$ and $1 \leq m \leq M$;
a second plurality of optical frequencies $f_{m,j}$ includes the first plurality of K distinct optical frequencies, wherein $1 \leq j \leq J$ and $1 \leq m \leq M$; and,
wherein K>max(J,M); and, $|f_{m,j+1} - f_{m,j}| \neq |f_{m+1,j} - f_{m,j}|$, wherein $1 \leq j \leq J-1$ and $1 \leq m \leq M-1$.

In accordance with another aspect of the invention herein provided, the M input ports and the J output ports of the dispersive element are disposed so that the dispersive element is capable of:
dispersing light input into one of the M input ports into J separate frequency bands having J central frequencies and a first frequency spacing $\Delta f_1$ therebetween through J output ports; and,
dispersing light inputted into one of the J output ports into M separate frequency bands having M central frequencies and a second frequency spacing $\Delta f_2$ therebetween differing from $\Delta f_1$ by $\delta f > 0$ through the M input ports;
and wherein the monitoring means are for monitoring the spectrum of the input optical signal at a plurality of optical frequencies spaced by $\delta f$.

In accordance with the invention there is further provided an apparatus for monitoring the input optical signal at a first plurality of K distinct optical frequencies, comprising:
an AWG having M input ports and J output ports, wherein M>1 and J>1;
N×M switching means having N input ports and M output ports, wherein $N \geq 1$, disposed to controllably couple the input optical signal from any of said N input ports to any one of the M input ports of the AWG through the M output ports of the N×M switching means,
monitoring means comprising J photodetectors responsive to light coupled therein, and wherein each of said J photodetectors is optically coupled to a different one of the J output ports for receiving light therefrom at one of the plurality of optical frequencies when the input optical signal is coupled into one of the M input ports; and
wherein the AWG and the N×M switching means are formed in a single PLC chip.

In accordance with another aspect of the invention, there is further provided a method for monitoring an input optical signal at a plurality of K distinct optical frequencies, comprising the steps of:

a. providing a dispersive element having M input ports and J output ports, wherein M>1 and J>1, and wherein:

b. the dispersive element couples an m-th input port to a j-th output port at an optical frequency $f_{m,j}$ for all integer values of m and j satisfying conditions $1 \leq j \leq J$ and $1 \leq m \leq M$, c. $|f_{m,j+1}-f_{m,j}| \neq |f_{m+1,j}-f_{m,j}|$ for all integer values of m and j satisfying conditions $1 \leq j \leq (J-1)$ and $1 \leq m \leq (M-1)$;

d. providing control means disposed to receive the input optical signal for providing the input optical signal sequentially to each of the M input ports;

e. providing J photodetectors responsive to light coupled therein, wherein each of said J photodetectors is optically coupled to a different one of the J output ports of the dispersive element for receiving light at one of the optical frequencies $f_{m,j}$ from said one of the J output ports when the input optical signal is coupled into one of the M input ports;

f. providing a processor unit capable of storing and processing information detected by the J photodetectors;

g. operating the control means to provide the input optical signal to predominantly one input port of the dispersive element, wherein j has a value between 1 and J inclusive;

h. detecting with the J photodetectors information related to the input optical signal at J optical frequencies $f_{m,j}$, wherein integer values of 'j' vary from 1 to J, and 'm' denotes the input port wherein the input optical signal is provided, 'm' having a value between 1 and M inclusive;

i. storing the information related to the input optical signal at the J optical frequencies $f_{m,j}$ in the processor unit;

j. sequentially repeating steps (e), (f) and (g) for each other input port of the dispersive element for detecting information related to the input optical signal at a plurality of frequencies $\{f_{m,j}\}$ wherein 'm' and 'j' can have any integer values satisfying the conditions $1 \leq j \leq J$ and $1 \leq m \leq M$;

k. processing the stored information in the processor unit and outputting the processed information related to the input optical signal at at least some of the plurality of optical frequencies $f_{m,j}$.

BRIEF DESCRIPTION OF THE DRAWINGS

Exemplary embodiments of the invention will now be described in conjunction with the drawings in which.

DETAILED DESCRIPTION OF THE PREFERRED EMBODIMENT

Exemplary embodiments of an optical apparatus for monitoring an input optical signal are shown in FIG. 1 and FIGS. 3–8 and are hereafter described.

Figure 1:
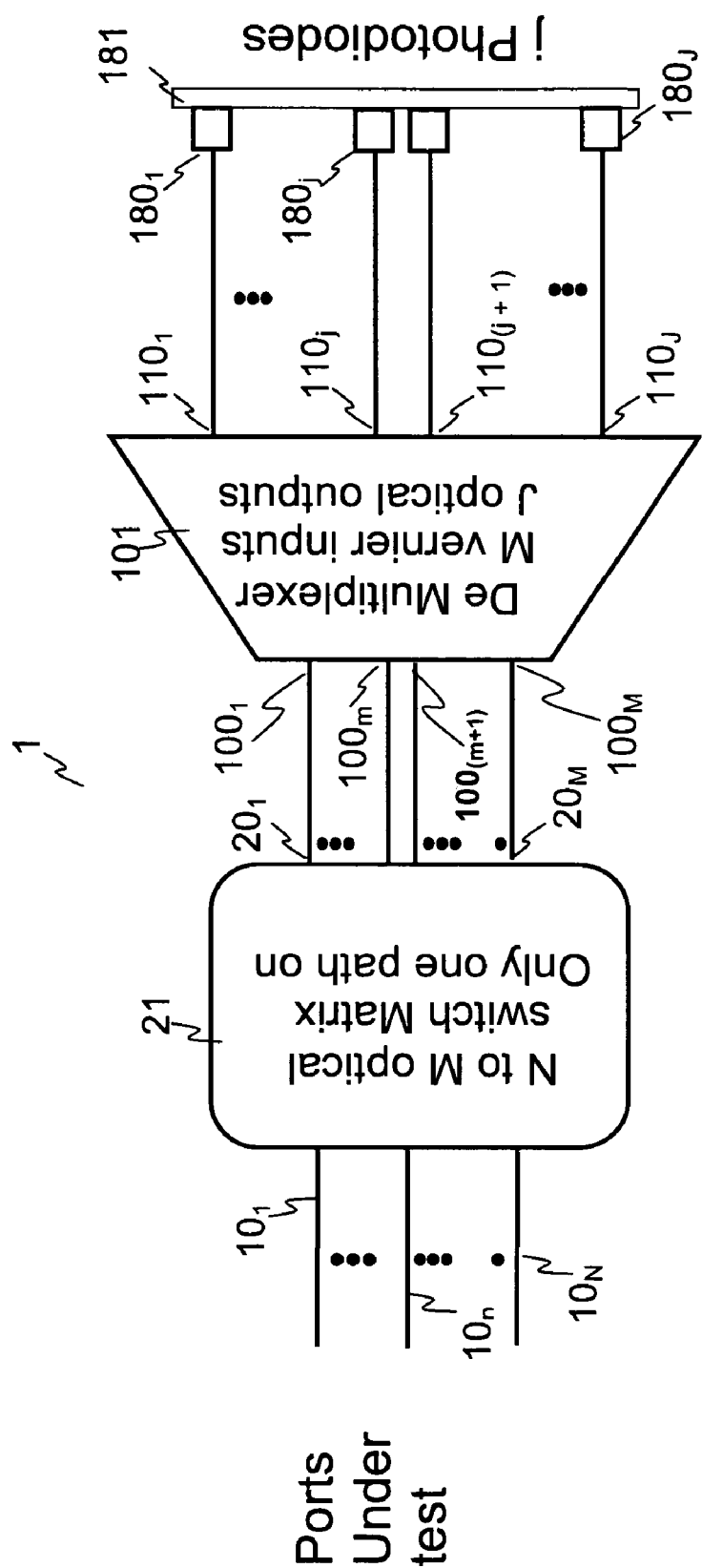
FIG. 1 is a general diagram of the apparatus for monitoring an input optical signal according to the invention.

With reference to FIG. 1, an apparatus 1 for monitoring an input optical signal at a first plurality of K distinct optical frequencies, K>1, has a dispersive element 101 disposed between N×M switching means 21 and monitoring means 181. The N×M optical switching means 21 hereafter are also referred to simply as switch 21, which can be embodied as an N×M optical switch matrix, or in other ways, examples of which will be described later in this specification. The switch 21 has N optical input ports $10_1$ to $10_N$ and M optical output ports $20_1$ to $20_M$ and has a functionality of controllably providing optical coupling between any input port to any one output port. The dispersive element 101 has M input ports $100_1$ to $100_M$, each of which is optically coupled to a different output port of the switch 21. The monitoring means 181 are preferably a photodiode array assembly having J photodiodes $180_1$ to $180_J$, each optically coupled to a different output port of the dispersive element 101 for detecting light output therefrom.

The apparatus 1 also has electronic control and processing means, which are not shown in FIG. 1, including at least a controller for controlling the switch 21, a memory for collecting information detected by the monitoring means 181, and a processor for processing the collected information, and for outputting processed information. The switch 21 and its corresponding controller comprise control means for providing the input optical signal sequentially to each of the M input ports $100_1$ through $100_M$ of the dispersive element 101.

In the dispersive element 101, each input port is optically coupled with any one output port in a narrow frequency band of width b centered at a different optical frequency, so that for example an $m^{th}$ input port $100_m$ is optically coupled to a $j^{th}$ output port $110_j$ only within a narrow frequency band centered at a frequency $f_{m,j}$, which is hereafter also referred to as a central transmission frequency, and is coupled to a neighboring (j+1)th output port at a frequency $f_{m,j+1}=f_{m,j}+\Delta f_1$, where a first frequency spacing $\Delta f_1 > b$. Functionally, the dispersive element splits an optical signal coupled to an m-th input port into J equally-spaced narrow frequency bands centered at frequencies $\{f_{m,j=1 \ldots J}\}$ spaced by $\Delta f_1$, for any value of m between 1 and M, and couples each of the J equally-spaced frequency bands to a different output port from the plurality of output ports $110_1$ to $110_J$.

A plurality of optical frequencies $f_{m,j}$ for all values of m and j satisfying conditions $1 \leq m \leq M$ and $1 \leq j \leq J$ will be hereafter referred to as a second plurality of optical frequencies, or as a plurality of optical frequencies $\{f_{m,j}\}$. The plurality of optical frequencies $\{f_{m,j}\}$ includes the first plurality of K distinct optical frequencies.

The dispersive element 101 is preferably an AWG having M input waveguide ports and J output waveguide ports. An AWG is a well known optical element in the art fabricated in a PLC chip and is most frequently used as a multiplexer-demultiplexer in WDM networks. In a typical configuration, an AWG has one input port and multiple output ports when used as a demultiplexer, with the input and output designations reversed when it is used as a multiplexer. AWGs with multiple input ports and multiple output ports are also known in the art. For example, in U.S. Pat. No. 5,617,234 to Koga et al., a multi-wavelength simultaneous monitoring circuit is disclosed employing an arrayed-waveguide grating having multiple input ports and multiple output ports. There is however a significant difference between the AWG configuration described in U.S. Pat. No. 5,617,234 and which is typically used in the art, and an AWG configuration of the present invention.

Figure 2:
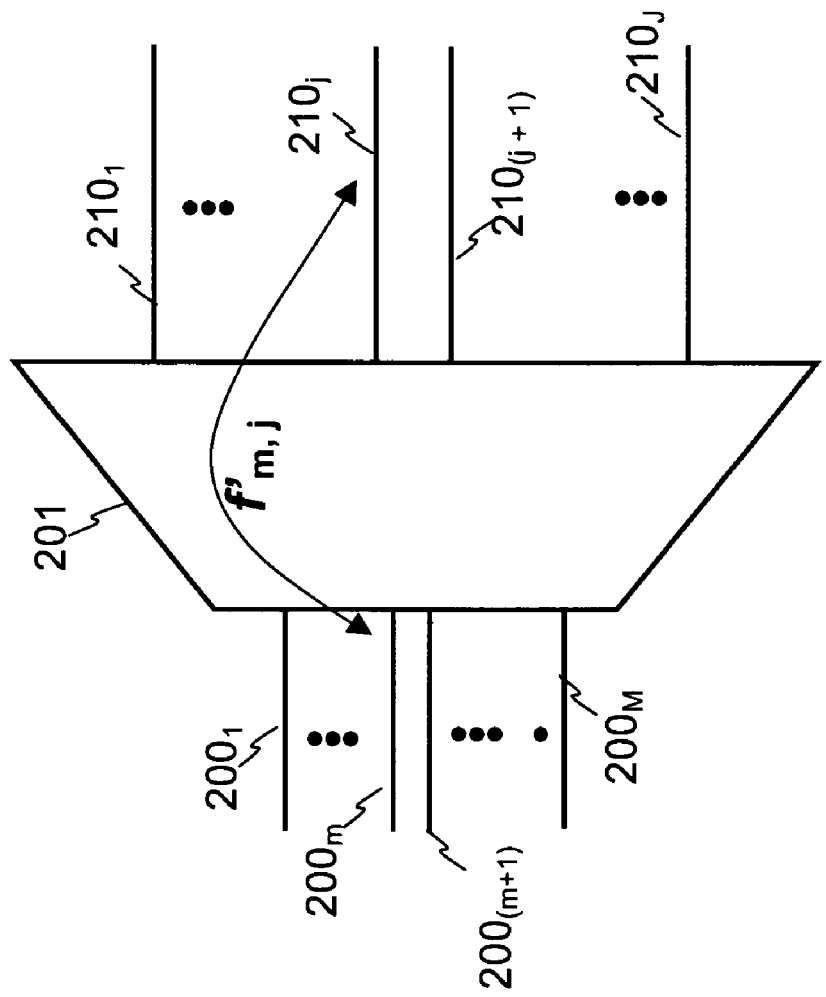
FIG. 2 is a schematic diagram of a prior-art demultiplexing AWG having multiple input ports.

Indeed, a de-multiplexing AWG having multiple input ports has the functionality of splitting an optical signal coupled into one of it input ports into periodically-spaced frequency bands, and dispersing them to different locations where they are picked up by output waveguides to be output through their respective output ports. In a configuration described by Koga, assuming the aforedescribed notations for input ports and output ports, the correspondence between the center transmission frequencies $f_{m,j}$ and the output ports periodically shifts by one channel when the input waveguide is shifted by one position, meaning that $f_{m,j}=f_{m+1,j+1}$. That is, with reference to FIG. 2 showing a demultiplexer 201 schematically representing a de-multiplexing prior art AWG analogues to the one described by Koga, if an input optical signal carries a channel centered at frequency $f_{m,j}$, this channel will be output from the $j^{th}$ port $210_j$ if the input optical signal is coupled into the $m^{th}$ input port $200_m$, and will be output from the (j+1)th output port $210_{(j+1)}$ when the input optical signal is coupled into the (m+1)th input port $200_{(m+1)}$.

This functionality allows any input port $200_1$ to $200_M$ to be used for frequency de-multiplexing a signal having optical channels spaced periodically in frequency; it also requires that an (m+1)th input port $200_{(m+1)}$ is optically coupled to a $j^{th}$ output port $210_j$ at a central transmission frequency $f_{m+1,j}=f_{m,j}-\Delta f_1$ for any values of m and j between 1 and M', and 1 and J' respectively, wherein M' and J' are respectively the numbers of input and output ports of the de-multiplexing AWG 201.

Turning back to FIG. 1, in an important difference to the aforedescribed functionality of a typical prior-art de-multiplexing AWG with multiple input ports, the input ports $100_1$ to $100_M$ of the AWG used as the dispersive element 101 of the present invention are disposed so that $$f_{m,j} \ne f_{m+1,j+1} \tag{1}$$

for any values of m and j between 1 and M−1, and 1 and J−1 respectively, and $$(f_{m,j}-f_{m+1,j})=\Delta f_2 \ne \Delta f_1 \tag{2}$$

for any integer values of m and j between 1 and M−1, and 1 and J respectively. A second frequency spacing $\Delta f_2$ defined by the relationship (2) differs therefore from the first frequency spacing $\Delta f_1$. Note that the second frequency spacing $\Delta f_2$ is a frequency spacing between optical signals output from the ports $100_1$ to $100_M$ when an input optical signal is coupled into one of the ports $110_1$ to $110_J$. The relationship (2) means therefore that, opposite to the prior-art AWG arrangement of the input and output ports aforedescribed in reference to FIG. 2, the AWG 101 is asymmetrical with respect to the frequency spacing between the central transmission frequencies, with said spacing depending on which set of ports $100_{1\ldots M}$ or $110_{1\ldots J}$ is used as a set of input ports.

In a preferred embodiment, the second spacing $\Delta f_2$ is chosen so that a difference $\delta f$ between the second spacing $\Delta f_2$ and the first spacing $\Delta f_1$, $\delta f=\Delta f_2-\Delta f_1$, satisfies one of conditions (3):

$$\gamma f = \pm \Delta f_1/M, \tag{3}$$

in which case $\delta f$ determines a frequency spacing between optical channels that can be monitored using the apparatus of present invention as will be discussed hereafter in the specification.

Functioning of the apparatus for monitoring an input optical signal will now be described with reference to FIGS. 3 and 4.

Turning first to FIG. 1, the input optical signal is coupled to one of the input ports $10_1$ to $10_N$ of the M×N switch 21 for monitoring said signal. A main function of the M×N switch 21 is to establish an optical path from an input port of the switch 21 wherein the input optical signal is sequentially coupled to each input optical port of the dispersive element 101, from the port $110_1$ to the port $110_M$.

Figure 3:
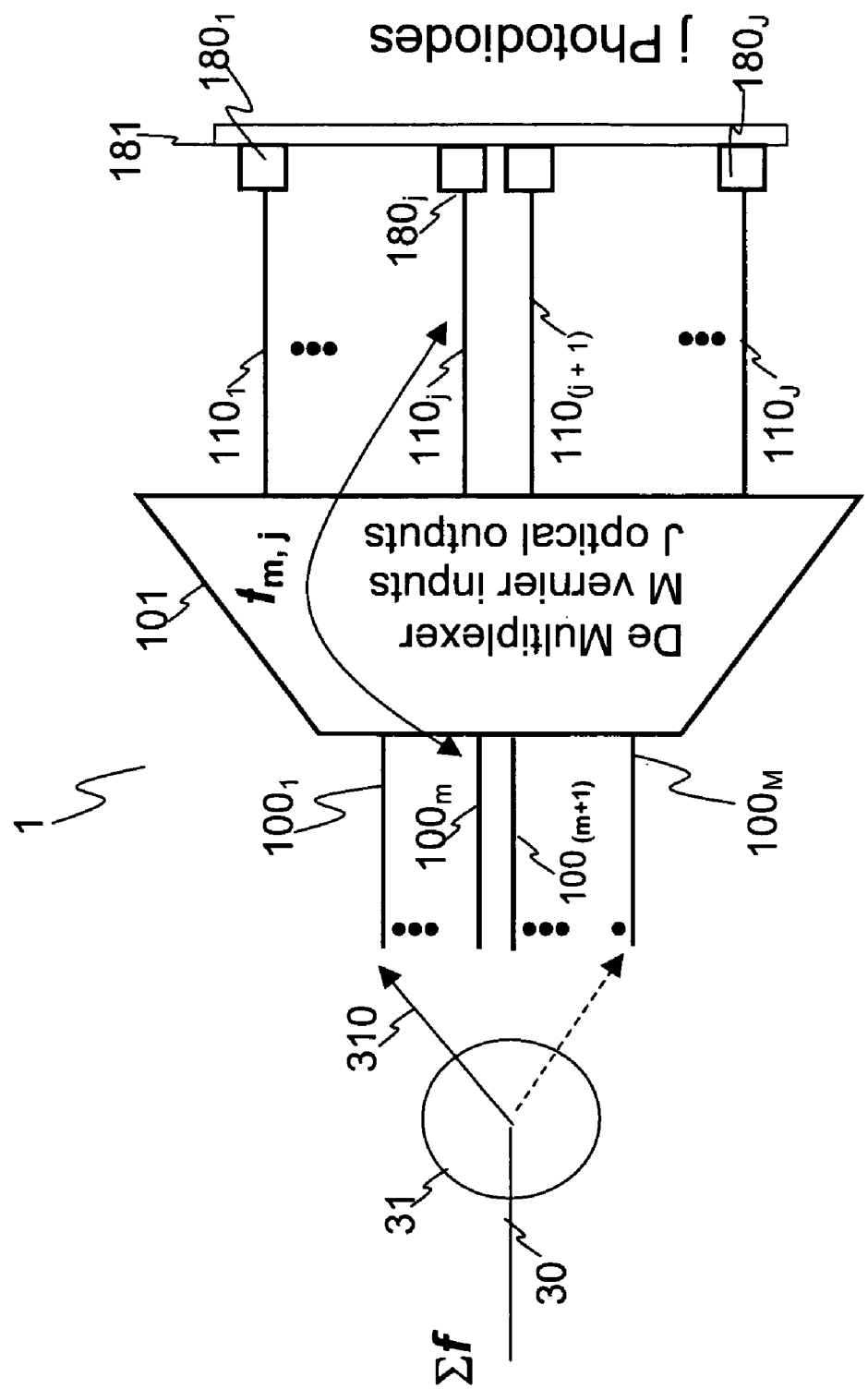
FIG. 3 is a diagram illustrating input port switching in the apparatus for monitoring an input optical signal according to the invention.

Turning now to FIG. 3, this function is schematically illustrated by a switch 31. An input port of the N×M switching means 21 wherein the input optical signal is coupled is represented by a port 30, and an arrow labeled "310" represents the optical-path which is sequentially in time established by the switch 31 to each input port of the dispersive element 101.

For example, the input optical signal including all frequencies from the plurality $\{f_{m,j}\}$ is first coupled into the input port $100_1$, and information about the input signal, such as e.g. optical power within a corresponding set of transmission bands of the dispersive element 101, is collected at a first set of J frequencies $$\{f_{1,j}\}=f_{1,1}+(j-1)\cdot\Delta f_1, j=1 \ldots J \tag{4}$$

by the J photodetectors $180_1$ to $180_J$.

Next the input signal is coupled into the second input port $100_2$, not shown in the FIG. 3, of the dispersive element 101, and information is collected about the signal at a second set of frequencies $$\{f_{2,j}\}=f_{1,1}+j\cdot\Delta f_1+\delta f, j=1 \ldots J \tag{5}$$

where expression (2) was used to derive expression (5).

Next the input signal is coupled into the third input port $100_3$, also not shown in the FIG. 3, of the dispersive element 101, and information is collected about the signal at a third set of frequencies $$\{f_{3,j}\}=f_{1,1}+(j+1)\cdot\Delta f_1+2\cdot\delta f, j=1 \ldots J \tag{6}$$

Switching the input signal consecutively in M steps through all M input ports of the dispersive element 101, and at each step collecting and storing the information about the signal at a respective set of J frequencies, information is obtained about the signal at M sets of frequencies $$\{f_{m,j}\}=f_{1,1}+(j+m-2)\cdot\Delta f_1+(m-1)\cdot\delta f, j=1 \ldots J, m=1 \ldots M \tag{7}$$

forming the second plurality of frequencies $\{f_{m,j}\}$.

The use of two dissimilar periods $\Delta f_1$ and $\Delta f_2$ producing a scale with a fractional period $\delta f$ is somewhat similar to a well-known vernier scale in e.g. Vernier calipers; the M input ports of the dispersive element 101, are therefore referred to in the specification as the Vernier ports.

In an exemplary embodiment wherein the input ports $100_1$ to $100_M$ of the dispersive element 101 are disposed so that $$\delta f=\Delta f_1/M, \tag{8}$$

frequencies from the plurality of frequencies $\{f_{m,j}\}$ between frequencies $f_{1,M}$ and $f_{M,J}$ form a periodic set of frequencies spaced by $\delta f$, consisting of $K=(J-M)\cdot M$ frequencies, which also form the first plurality of K distinct optical frequencies.

Figure 4:
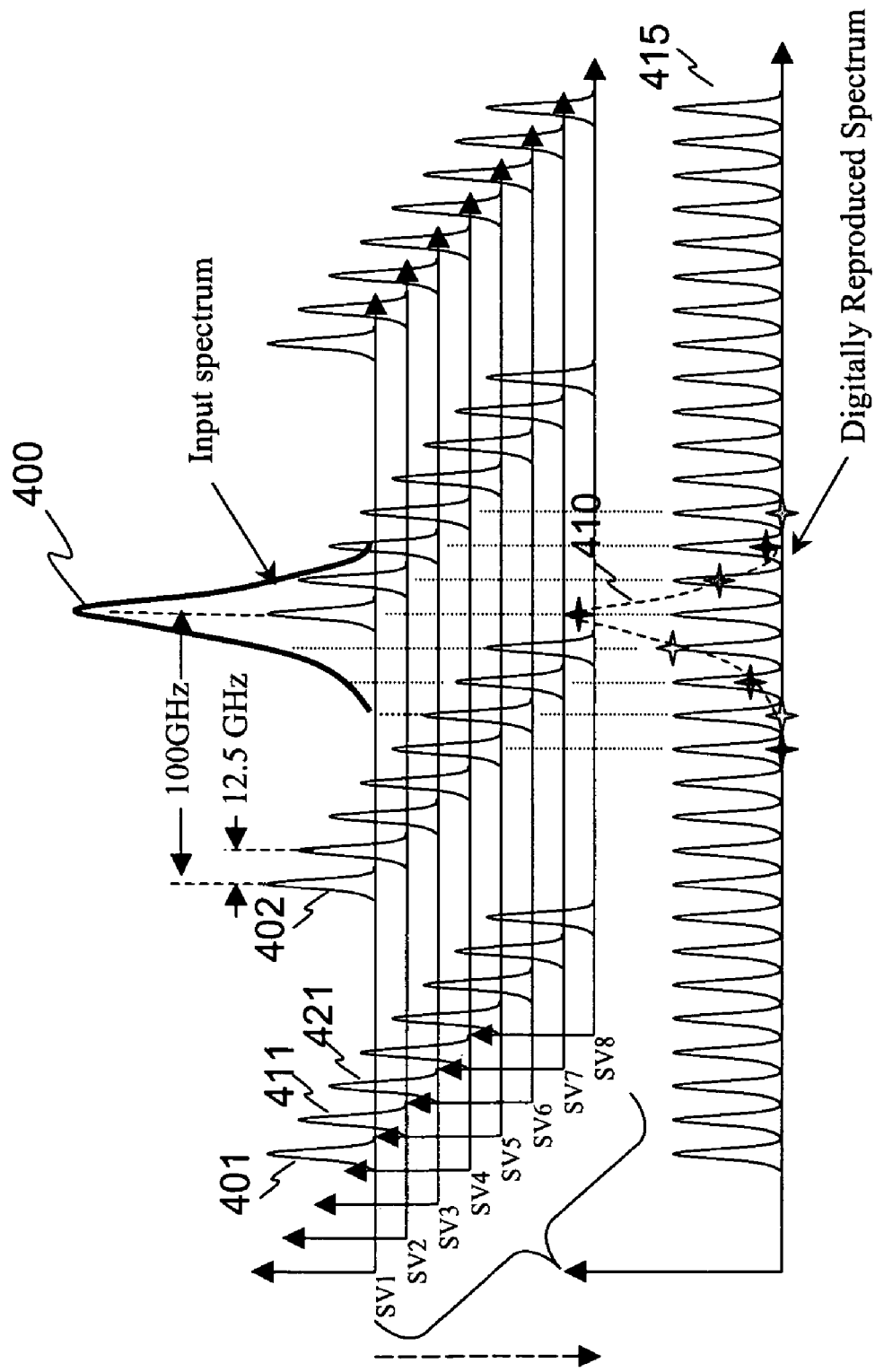
FIG. 4 is a diagram of spectral bands monitored by the apparatus of the present invention.

By way of example, FIG. 4 illustrates measuring a spectrum of an input optical signal having a single spectral line

400 using the apparatus of present invention. In this example, the dispersive element is an AWG having parameters M=8, $\Delta f_1$=100 GHz, $\Delta f_2$=112.5 GHz, $\delta f$=12.5 GHz, J=40, which can be manufactured using currently available fabrication technologies. A set of 8 plots labeled SV1 to SV8 shows transmission bands 401, 402, . . . 411, . . . 421 etc. corresponding to 4 adjacent output ports, from the set of J=40 output ports, of the dispersive element 101 when the input optical signal is consecutively coupled into each of the 8 input ports $100_1$ to $100_M$ of the dispersive element 101.

The transmission bands 401, 402 etc. of the AWG are designed so that there is a moderate overlap between the transmission bands corresponding to the same output port and adjacent input ports, which central frequencies are shifted by $\delta f$=12.5 GHz as shown in FIG. 4, but a very small amount of overlap with a next adjacent transmission band spaced in a summary transmission spectrum 415 of the AWG by 25 GHz. The overlap information is stored in the electronic memory (not shown) of the apparatus 1 for calibration purposes.

In each consecutive step, a portion of the spectral line 400 within each transmission band is detected by a photodetector from the photodetector array assembly 181 coupled to a corresponding output port of the dispersive element 101, and 40 values output by the photodetectors are stored in the memory. After stepping the input signal through all of the 8 input ports, the totality of all stored values can be used to produce a digitized line 410 reproducing the input spectral line 400 on a digitized frequency scale with a frequency step $\delta f$=12.5 GHz.

In this exemplary embodiment the apparatus of present invention, using 40 photodiodes and the AWG with a 100 GHz output frequency spacing, is capable of monitoring an input optical signal at K=256 frequencies spaced by $\delta f$=12.5 GHz, as illustrated by a summary transmission spectrum 415 obtain by superimposing the 8 transmission spectra of the AWG corresponding to consecutive coupling the input signal into each of the 8 input ports $100_1$ . . . $100_M$.

Figure 5:
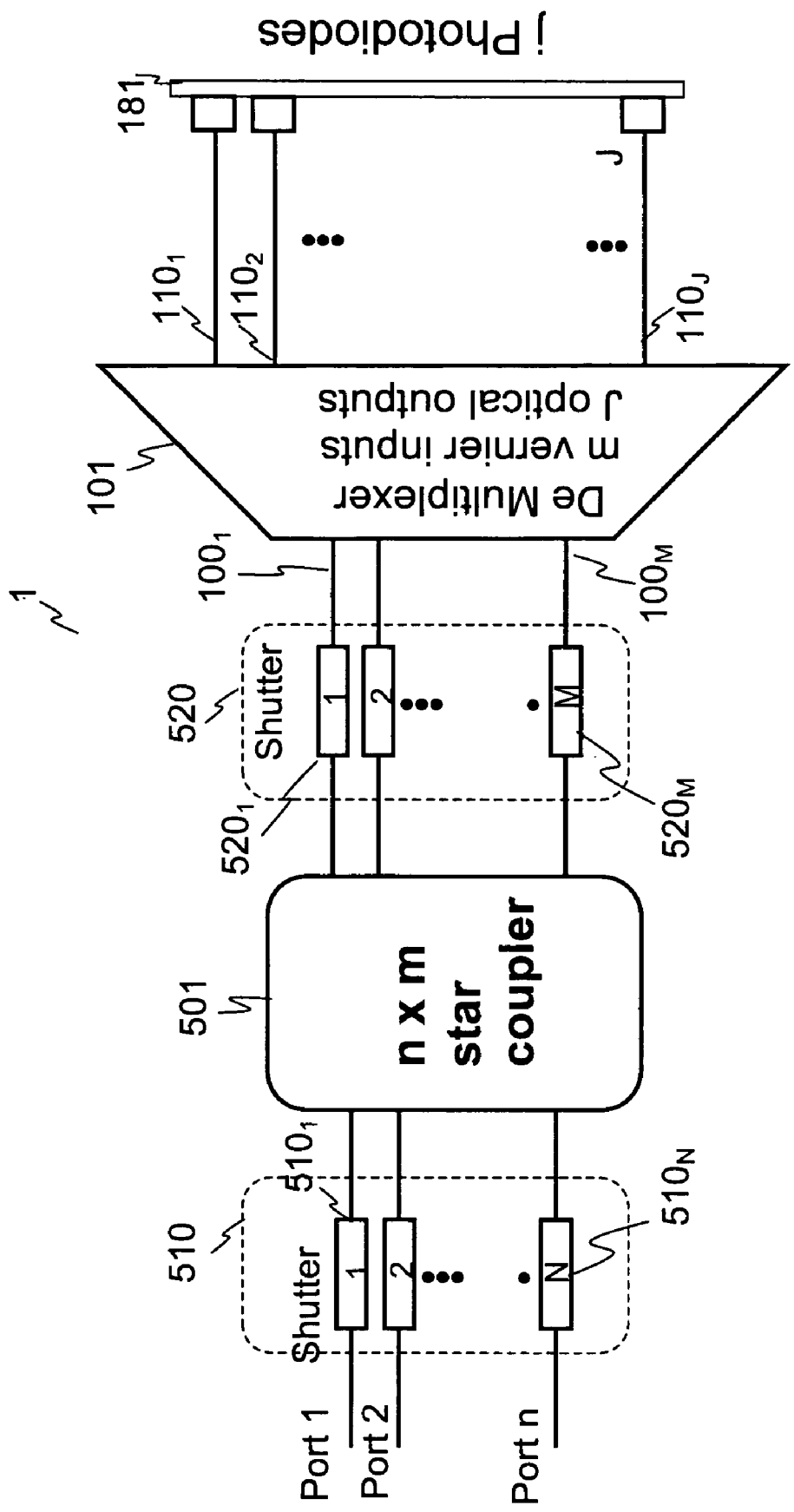
FIG. 5 is a diagram of the apparatus of present invention including N×M star coupler.

The N×M switch 21 can be implemented in different ways. FIG. 5 illustrates an embodiment wherein the N×M switch 21 is realized using coupling means 501 embodied as an N×M star coupler having N input ports optically connected to first blocking means 510 embodied as N optical shutters $510_1$ to $510_N$, each operable to either block or open an optical path to the N×M coupler, and having M output ports optically connected to the M input ports $100_1$ to $100_M$ of the dispersive element 101 through second blocking means 520 embodied as M optical shutters $520_1$ to $520_M$, each operable to either block or open an optical path from the coupler 501 to a corresponding input port of the dispersive element 101. The shutters can be any known shutters that can be formed in a waveguide chip and controlled electrically and/or thermally. The shutters may be embodied as one or more Mach-Zehnder switches or Mach-Zehnder interferometer shutters, such as those described in M. Okuno et al., "Silica-Based Thermo-Optic Switches," NTT Review, Vol. 7, No. 5 (September 1995), incorporated by reference herein. In addition, the shutters may be embodied as, e.g., electro-absorption modulators or Y-branch switches. The demultiplexer 101 can be embodied as an AWG.

In order to selectively pass or block the incoming signal, the shutters $510_1$ through $510_N$ and $520_1$ through $520_M$ are controlled by a thermo-optic or electro-optic control signal (not shown), as appropriate for the selected shutter.

In operation, the circuit in accordance with the embodiment of the invention shown in FIG. 5 functions in the following manner. Up to N composite optical signals, for example typical communications signals comprising a plurality of optical channels including at least some of the frequencies $\{f_{mj}\}$, are tapped and the tapped portions are fed to respective input ports of the shutters $510_1$ to $510_N$. In the instance where one composite signal is to be monitored, one of the N shutters 510 is programmed to pass the corresponding taped portion of it forming the input signal, and the remaining N−1 shutters are programmed to block the other tapped portions from reaching the coupler 501, which couples any of the N input port to all M output ports. The shutters 520 are programmed to block the input signal from reaching all but one input port of the dispersive element 101, opening one of the shutters 520 at a time while blocking the other M−1, and cycling through all M shutters 520 to monitor the input signal at the K frequencies.

In a preferred embodiment, the circuit shown in FIG. 5 formed by the shutters 510 and 520, the star coupler 501 and the dispersive element 101 embodied as the AWG, is formed in a single PLC chip.

Figure 6:
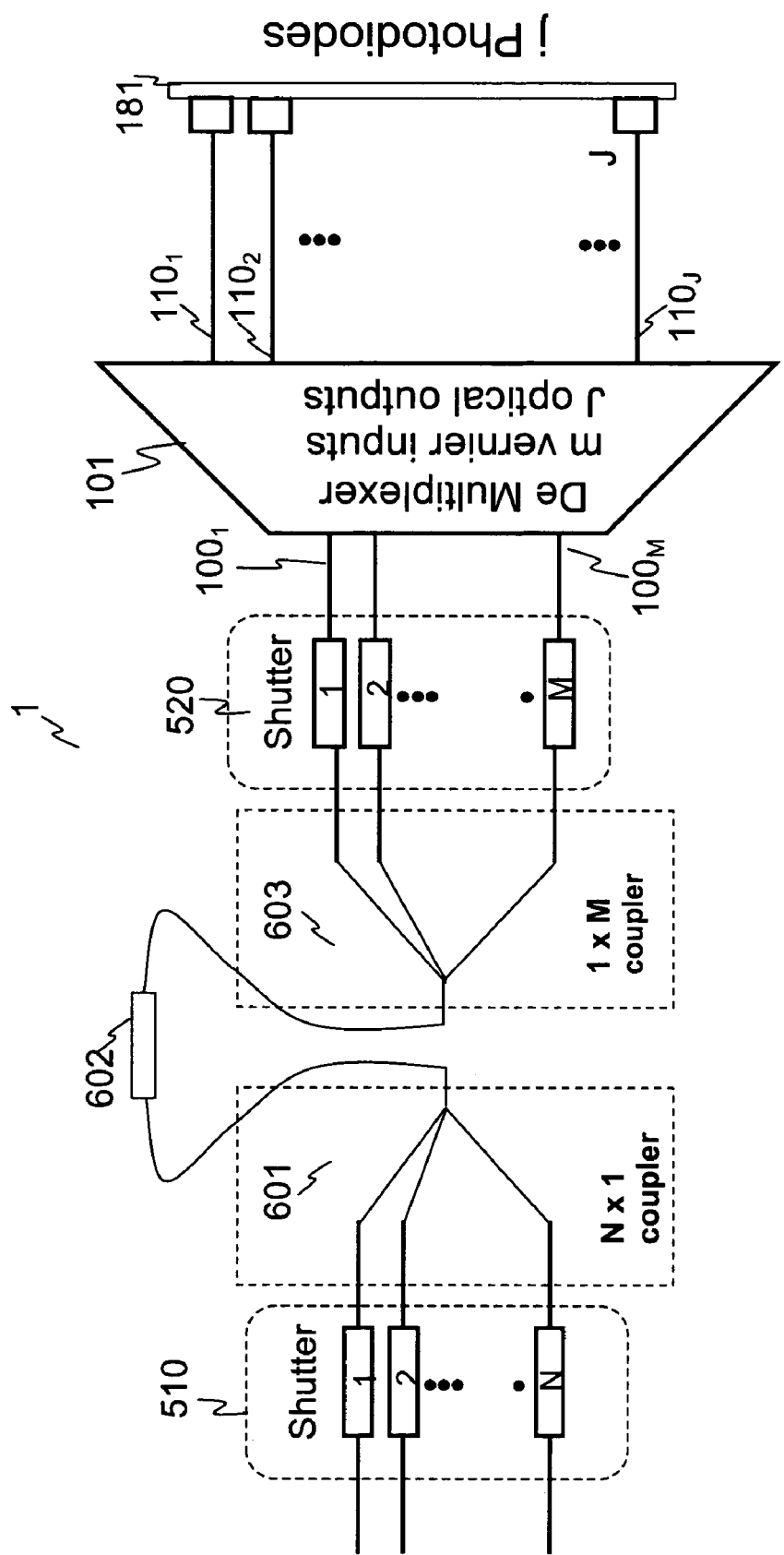
FIG. 6 is a diagram of the apparatus of present invention including an N×1 coupler and a 1×M coupler.

FIG. 6 illustrates another embodiment wherein the N×M optical star coupler 501 is substituted with two couplers, an N×1 coupler 601, which is hereafter also referred to as a N×1 combiner, and a 1×M coupler 603, which is hereafter also referred to as a 1×M splitter. In this embodiment, a single output port of the coupler 601 can be coupled to a single input port of the coupler 603 through either a direct interconnect or through an additional optional functional optical element 602 such as for example an optical isolator and/or an optical passband filter. The isolator is added to increase the return loss and the bandpass filter is added to remove the free spectral range (FSR), that is, the periodic reproduction at different orders of the AWG.

Figure 7:
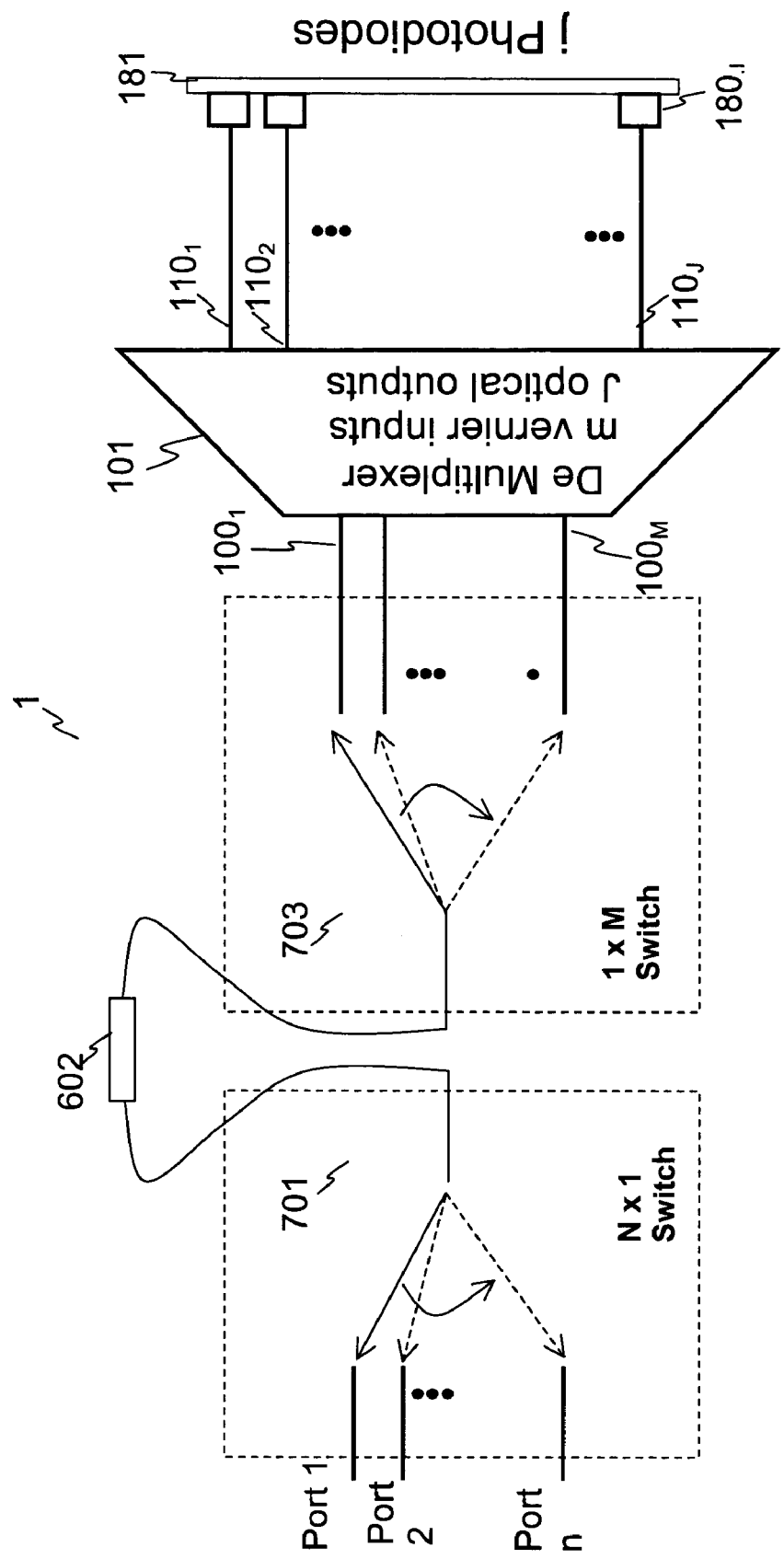
FIG. 7 is a diagram of the apparatus of present invention including an N×1 switch and a 1×M switch.

FIG. 7 illustrates yet another embodiment, which differs from the embodiment shown in FIG. 6 by replacing the couplers 601 and 603 with respectively an N×1 optical switch 701 for selecting an input signal from one of the N input ports of the apparatus, and a 1×M optical switch 703. This embodiment has lower optical loss but can be more expensive to implement than the embodiment shown in FIG. 5 and FIG. 6.

Figure 8:
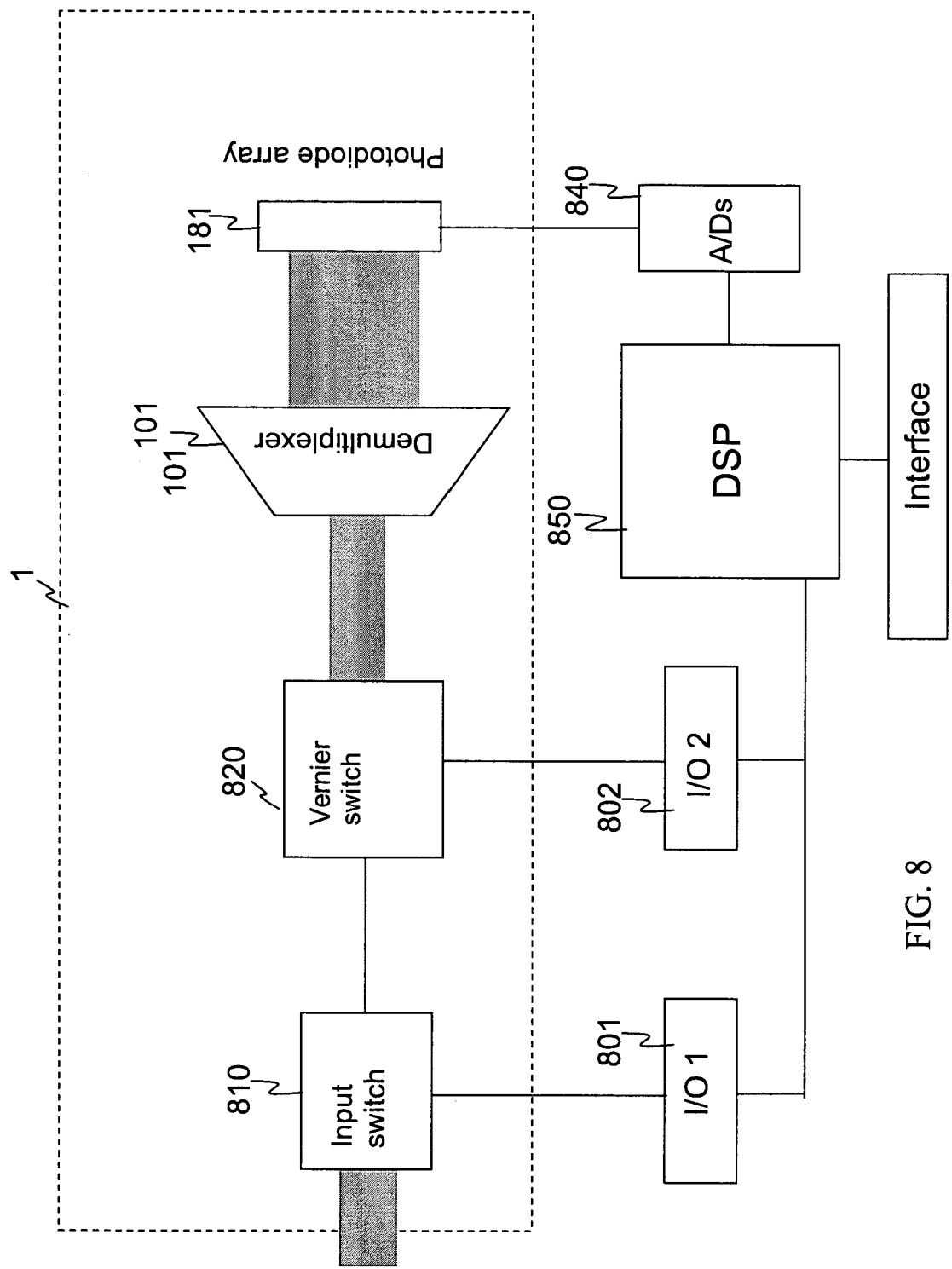
FIG. 8 is a schematic diagram of a control circuitry of the apparatus of present invention.

FIG. 8 schematically illustrates a control circuitry that can be used to control operation of the apparatus 1 of the present invention. An electrical controller 801 controls an input switch 810, which is realized for example as the N×1 switch shown in FIG. 7 or using the N shutters 510 shown in FIGS. 5 and 6, to select an input signal for monitoring. An electrical controller 802 controls operation of a Vernier switch 820, which is realized for example as the 1×M switch 703 shown in FIG. 7 or using the M shutters 520 shown in FIGS. 5 and 6. The Vernier switch 820 steps through the M input ports of the dispersive element 101 in response to a control signal from the electrical controller 802, thereby providing the input optical signal to one input port of the dispersive element 101 at a time.

At each step, the photodioide array 181 outputs J values indicative of optical signals incident upon each photodiode, and therefore providing information of the input signal at a set of J frequencies $\{f_{m,\,j=1\ldots J}\}$ as described above in this specification, and communicates these values through an analog-to-digital converter 840 to a digital signal processing (DSP) unit 850. The DSP unit has an electronic memory wherein the set of J values indicative of the input signal at a set of J frequencies $\{f_{m,j=1\ldots J}\}$ is stored in each step. The DSP unit 850 also controls the operation of the electrical controllers 801 and 802, and processes the information collected from the photodiode array 181 using pre-stored calibration information to determine an optical spectrum of the input signal. In some embodiments, the DSP unit also computes and outputs OSNR for communication channels present in the input signal, detects presence or absence of a particular communication channel in the input signal, and detects deviations of a central frequency of a communication channel from a pre-determined, for example the ITU, grid.

The apparatus 1 is pre-calibrated by using a known input optical signal, stepping the input signal sequentially through each input port of the dispersive element 101, and collecting signals from each photodetector from the photodetector array 181 at each step, and the calibration values are stored in the DSP memory. Information about the shape and width of the transmission bands of the dispersive elements, and measured values of the central transmission frequencies $f_{mj}$ are also stored in the memory as calibration data used in the processing of values output by photodetectors in operation. Because of the aforenoted partial overlap between transmission bands of the dispersion element 101 spaced by $\delta f$, the frequencies $f_{mj}$ do not have to coincide with central frequencies of the communication channels present in the input signal, e.g. the ITU grid. The apparatus 1 can also be calibrated over temperature, obviating the need for athermal packaging.

While the embodiment wherein the AWG is used as the dispersive element 101 offers some advantages, the dispersive element 101 can be also embodied for example as a bulk blazed grating, a holographic grating, or a volume phase grating. The monitoring means can be embodied with discrete, or arrayed photo-sensitive optoelectronic device, including but not restricted to photo-diodes and opto-thermal-electronic devices, or charged-coupled devices. The switch 21 can also be embodied as a mechanical optical switch, a planar waveguide switch or a MEMs switch.

In summary, the invention provides an apparatus for monitoring an input optical signal capable of functioning as an OPM, which main optical parts can be monolithically integrated in a single LPC chip coupled to an array of photodiodes, and which does not have tunable filters obviating the need for associated control loops. Using an AWG with M Vernier input ports and J outputs in combination with a switch for cycling through the M Vernier input ports, an input signal can be monitored at almost M times more frequencies than using a single-input AWG, on an M times denser frequency grid.

Of course numerous other embodiments may be envisioned without departing from the spirit and scope of the invention.

What is claimed is:

1. An optical apparatus for monitoring an input optical signal comprising:

a dispersive element having M input ports and J output ports, wherein M>1 and J>1;

control means disposed to receive the input optical signal for providing the input optical signal sequentially to each of the M input ports; and monitoring means optically coupled to the J output ports for monitoring one or more optical signals output therefrom for collecting information about the input optical signal at a plurality of K distinct optical frequencies, wherein K>max(J,M);

wherein:

the dispersive element couples an $m^{th}$ input port to a $j^{th}$ output port at an optical frequency $f_{m,j}$ for all integer values of m and j satisfying conditions $1 \leq j \leq J$ and $1 < m < M$;

a totality of the optical frequencies $f_{m,j}$ includes the plurality of K distinct optical frequencies; and $|f_{m,j+1} - f_{m,j}| \neq |f_{m+1,j} - f_{m,j}|$, wherein $1 \leq j \leq (J-1)$ and $1 \leq m \leq (M-1)$.

2. An optical apparatus as defined in claim 1, wherein the monitoring means comprises J photodetectors responsive to light coupled therein, and wherein each of said J photodetectors is optically coupled to a different one of the J output ports for receiving light at one of the optical frequencies $f_{m,j}$, wherein integers m and j satisfy the conditions $1 \leq j \leq J$ and $1 \leq m \leq M$, from said one of the J output ports when the input optical signal is coupled into one of the M input ports.

3. An optical apparatus as defined in claim 1, wherein the dispersive element comprises an array waveguide grating (AWG) having at least M input waveguide ports and at least J output waveguide ports.

4. An optical apparatus as defined in claim 1, wherein the dispersive element comprises a grating having at least M input fiber-optic ports and at least J output fiber-optic ports.

5. An optical apparatus as defined in claim 4, wherein the grating is one of a bulk grating, a blazed grating, a volume Bragg grating and a holographic grating.

6. An optical apparatus as defined in claim 1, wherein the control means comprise N×M switching means having N input ports and M output ports, wherein N≧1, disposed to controllably couple the input optical signal from any of said N input ports to any one of the M input ports of the dispersive element through output ports of the N×M switching means.

7. An optical apparatus as defined in claim 1, integrated on a planar waveguide chip.

8. An optical apparatus as defined in claim 6, wherein the N×M switching means comprise first blocking means having N input ports and N output ports disposed to receive the input optical signal through one of the N input ports and output it through any one of the N output ports;

N×M coupling means having N input ports and M output ports for coupling each of said N input ports to each of said N output ports, wherein each of the N input ports of the N×M coupling means is coupled to a different output port of the first blocking means; and second blocking means having M input ports and M output ports capable of selectively coupling any one of said M input ports to any one of said M output ports, wherein each of said M input ports of the second blocking means is coupled to a different output port of the N×M coupling means, and each of said output ports of the second blocking means is coupled to a different input port of the dispersive element.

9. An optical apparatus as defined in claim 8, wherein the N×M coupling means comprise an N×M star coupler.

10. An optical apparatus as defined in claim 8, wherein the N×M coupling means comprise a N×1 combiner having N input ports and one output port, and a 1×M splitter having one input port and M output ports, and wherein the output port of the combiner is coupled to the input port of the splitter.

11. An optical apparatus as defined in claim 10, wherein the output port of the combiner is coupled to the input port of the splitter through a functional optical module.

12. An optical apparatus as defined in claim 11, wherein the functional optical module is one of an optical isolator and an optical bandpass filter.

13. An optical apparatus as defined in claim 6, wherein the N×M switching means comprise an N×1 switch having N input ports and one output port, and an 1×M switch having one input port and M output ports.

14. An optical apparatus as defined in claim 13, wherein the output port of the N×1 switch is coupled to the input port of the 1×M switch through a functional optical module.

15. An optical apparatus as defined in claim 6, wherein the N×M switching means is an N×M switch fabric capable of selectively establishing preferential optical coupling between any one of the N input ports thereof and any one of the M output ports thereof.

16. An optical apparatus as defined in claim 2, wherein the J photodetectors comprise photodiodes.

17. Art optical apparatus as defined in claim 2, wherein the J photodetectors is an arrayed photo-sensitive opto-electronic device.

18. An optical apparatus as defined in claim 2, wherein the J photodetectors comprise opto-thermo-electronic devices.

19. An optical apparatus as defined in claim 1, wherein J is greater than M.

20. An optical apparatus for monitoring an input optical signal comprising:
   a dispersive element having M input ports and J output ports, wherein M>1 and J>1;
   control means disposed to receive the input optical signal for providing the input optical signal sequentially to each of the M input ports; and
   monitoring means optically coupled to the J output ports;
   wherein the dispersive element is configured so that
      light received into one of the M input ports is dispersed into J separate frequency bands having J central frequencies and a first frequency spacing $\Delta f_1$ therebetween through J output ports;
      light received into one of the J output ports is dispersed into M separate frequency bands having M central frequencies and a second frequency spacing $\Delta f_2$ therebetween differing from $\Delta f_1$ by $\delta f>0$ through the M input ports; and
      the monitoring means are for monitoring the spectrum of the input optical signal at a plurality of optical frequencies spaced by $\delta f$.

21. An optical apparatus as defined in claim 20, wherein at least one of the ratios $\Delta f_1/\delta f$ and $\Delta f_2/\delta f$ is substantially equal to M.

22. A method for monitoring an input optical signal at a plurality of K distinct optical frequencies, comprising the steps of:
   a) providing a dispersive element having M input ports and J output ports, wherein M>1 and J>1, and wherein:
      the dispersive element couples an m-th input port to a j-th output port at an optical frequency $f_{m,j}$ for all values of in and j satisfying conditions $1 \leq j \leq J$ and $1 \leq m \leq M$, and
      $|f_{m,j+1}-f_{m,j}| \neq |f_{m+1,j}-f_{m,j}|$ for all integer values of m and j satisfying conditions $1 \leq j \leq (J-1)$ and $1 \leq m \leq (M-1)$;
   b) providing control means disposed to receive the input optical signal for providing the input optical signal sequentially to each of the M input ports;
   c) providing J photodetectors responsive to light coupled therein, wherein each of said J photodetectors is optically coupled to a different one of the J output ports of the dispersive element for receiving light at one of the optical frequencies $f_{m,j}$ from said one of the J output ports when the input optical signal is coupled into one of the M input ports;
   d) providing a processor unit capable of storing and processing information detected by the J photodetectors;
   e) operating the control means to provide the input optical signal to predominantly one input port of the dispersive element, wherein j has a value between 1 and J inclusive;
   f) detecting with the J photodetectors information related to the input optical signal at J optical frequencies $f_{m,j}$, wherein 'j' has integer values varying from 1 to J, and 'm' denotes the input port wherein the input optical signal is provided, 'm' having an integer value between 1 and M inclusive;
   g) storing the information related to the input optical signal at the J optical frequencies $f_{m,j}$ in the processor unit;
   h) sequentially repeating steps e), f) and g) for each other input port of the dispersive element for detecting information related to the input optical signal at a plurality of optical frequencies $\{f_{m,j}\}$ wherein 'm' and 'j' can have any integer values satisfying the conditions $1 \leq j \leq J$ and $1 \leq m \leq M$; and
   i) processing the stored information in the processor unit and outputting the processed information related to the input optical signal at at least some of the plurality of optical frequencies $f_{m,j}$.

* * * * *

UNITED STATES PATENT AND TRADEMARK OFFICE
CERTIFICATE OF CORRECTION

| | | |
|---|---|---|
| PATENT NO. | : 7,035,505 B2 | Page 1 of 1 |
| APPLICATION NO. | : 10/896779 | |
| DATED | : April 25, 2006 | |
| INVENTOR(S) | : Shen et al. | |

It is certified that error appears in the above-identified patent and that said Letters Patent is hereby corrected as shown below:

Col. 12, line 40, "first blocicing means" should read -- first blocking means --

Signed and Sealed this

Thirteenth Day of February, 2007

JON W. DUDAS
*Director of the United States Patent and Trademark Office*